US008496530B2

(12) United States Patent
Dean

(10) Patent No.: US 8,496,530 B2
(45) Date of Patent: Jul. 30, 2013

(54) HAND HELD TABLET COMMUNICATING WITH GAMING MACHINE

(75) Inventor: David Dean, Elsternwick (AU)

(73) Assignee: Spielo International Canada ULC, Moncton, New Brunswick (CA)

( * ) Notice: Subject to any disclaimer, the term of this patent is extended or adjusted under 35 U.S.C. 154(b) by 1368 days.

(21) Appl. No.: 11/763,354

(22) Filed: Jun. 14, 2007

(65) Prior Publication Data

US 2008/0311971 A1 Dec. 18, 2008

(51) Int. Cl.
*A63F 9/24* (2006.01)
*A63F 13/00* (2006.01)

(52) U.S. Cl.
USPC .................. 463/42; 463/12; 463/13; 463/16; 463/17; 463/18; 463/19; 463/20; 463/25; 463/29; 463/43

(58) Field of Classification Search
USPC .................. 463/42–43, 25, 29, 12–13, 16–20
See application file for complete search history.

(56) References Cited

U.S. PATENT DOCUMENTS

| | | | | |
|---|---|---|---|---|
| 6,676,522 | B2 | 1/2004 | Rowe et al. | |
| 6,846,238 | B2 * | 1/2005 | Wells | 463/39 |
| 2003/0199312 | A1 * | 10/2003 | Walker et al. | 463/25 |
| 2004/0147308 | A1 * | 7/2004 | Walker et al. | 463/25 |
| 2004/0248514 | A1 * | 12/2004 | Idani et al. | 455/41.2 |
| 2006/0046849 | A1 * | 3/2006 | Kovacs | 463/39 |
| 2007/0060316 | A1 * | 3/2007 | O'Halloran | 463/25 |

* cited by examiner

*Primary Examiner* — Arthur O. Hall
*Assistant Examiner* — Jasson Yoo
(74) *Attorney, Agent, or Firm* — Patent Law Group LLP; Brian D. Ogonowsky

(57) ABSTRACT

The present invention is a small tablet that wirelessly communicates with a stationary gaming machine. The player makes bets using the tablet. The gaming machine, and not the tablet, determines the outcome of the game and transmits the award information to the tablet. The gaming machine may be an ordinary slot machine displaying random symbols in an array or displaying another game. The player using the tablet views the display on the gaming machine to see the outcome of a game, so the tablet does not need a large display to play a game. The player who operates the gaming machine bets independently from the player using the tablet. In another embodiment, the gaming machine is operated automatically, and multiple players with tablets independently bet on a common game.

15 Claims, 4 Drawing Sheets

HAND HELD TABLET COMMUNICATING WITH GAMING MACHINE

FIELD OF INVENTION

This invention relates to gaming machines and, in particular, to a portable player interface that allows a player to remotely share a gaming experience with another player.

BACKGROUND

A typical gaming machine found in casinos is operated by a sole player placing a bet and then pressing a button to spin actual or simulated reels. There is typically no player involvement in determining the outcome of a game. There is no means for the player to share the gaming experience with another player since each gaming machine operates independently from other gaming machines, and only one player at a time can bet on a single game.

Portable gaming devices are known that emulate a standard gaming machine, wherein the player bets credits previously stored in the portable device and then the device displays the rotation and stopping of reels on a video screen. The player is then awarded credits for a win and later redeems the credits for cash at a cashier station. Such portable devices either carry out an internal game program independently or communicate by radio waves with a central server that validates the bet and determines the outcome of the game. When a server is used, the portable device stops the displayed reels at the positions predetermined by the server. Using a server increases the security of the gaming system. One such portable gaming device is described in U.S. Pat. No. 6,676,522. Such portable devices are bulky since they include a relatively large display in order to easily see the game, and the battery is drained relatively quickly due to the display being on. Such portable devices are also expensive due to the display and the processor for controlling the game display. Further, such portable devices can only play simple games due to the restricted size of the display.

In the gaming devices described above, the playing experience is not shared with others. Some players may desire to share their playing experience with others to add a social aspect to their playing experience.

SUMMARY

A player is provided with a portable gaming device, referred to herein as a tablet, from a station in a casino. The player pays for credits at the station, and the tablet is wirelessly loaded with the purchased credits.

The tablet has a transceiver that wirelessly communicates with a standard stationary gaming machine. Each stationary gaming machine has an address and a transceiver. The player operating the tablet (referred to as the first player) enters the stationary gaming machine's address to establish a wireless connection between the tablet and the gaming machine. A second player plays the stationary gaming machine in the normal way by betting and, for example, spinning reels. The first player independently bets on the same game being played by the second player and views the display screen of the stationary gaming machine. After the reels are stopped, the stationary gaming machine awards the second player the conventional award and transmits a payout signal to the tablet. The tablet software determines, from the first player's bet and the payout signal, how many credits to award the first player on a credit meter in the tablet.

Since the tablet does not need a large display to display the game, the tablet may be very small, be inexpensive, and use up very little battery power. The transmission to the standard gaming machine is only intermittent and requires little power.

Therefore, two players can share the same gaming experience since they effectively play the same game. Additional players with tablets may also address the same stationary gaming machine and independently bet. In one embodiment, the player operating the stationary gaming machine must approve any remote player logging into the machine.

The invention also enables players to wager on games when all gaming machines are being played by other players. This provides an inexpensive alternative to casinos to handle peak traffic.

In another embodiment, the stationary gaming machine provides a large display for viewing by the public, such as over a bar. The electronics for the stationary gaming machine may be located anywhere within transmission range in the casino since the remote players are only concerned with the game display. Multiple players with tablets all bet independently on the same public display of the game. In such a case, no player needs to initiate the game on the stationary gaming machine, and an automatic mechanism initiates a new game every few seconds to spin and stop the video reels.

In another embodiment, the stationary gaming machine displays a different game outcome for each player that is logged into it. Such a gaming machine may use two screens, or the games may be sequentially displayed.

Although the tablet's display screen is relatively small, it can optionally display casino information, such as special offers and services, or display entertaining video, such as a movie. The tablet may even be used similar to a cell phone to make a call within the casino for services. The tablet may also include a tracker to locate the tablet remotely in case the player orders a service from the casino, so that the player can be easily found to deliver the service. The tablet may also have the ability to browse the internet. Although the tablet screen may be too small to adequately reproduce all the graphics on the gaming machine it is communicating with, the graphics may be modified for the tablet to simplify the graphics and focus on only essential elements necessary to see the results of the game.

BRIEF DESCRIPTION OF THE DRAWINGS

The below described drawings are presented to illustrate some possible examples of the invention.

DETAILED DESCRIPTION

Generally, the present invention is a small, inexpensive tablet that wirelessly communicates with a gaming machine.

The player makes bets using the tablet. The gaming machine, and not the tablet, determines the outcome of the game and transmits the award information to the tablet. The gaming machine may be an ordinary slot machine displaying random symbols in an array or displaying another game. The player using the tablet views the display on the gaming machine to see the outcome of a game, so the tablet does not need a large display to play a game. The player who operates the gaming machine bets independently from the player using the tablet.

Figure 1:
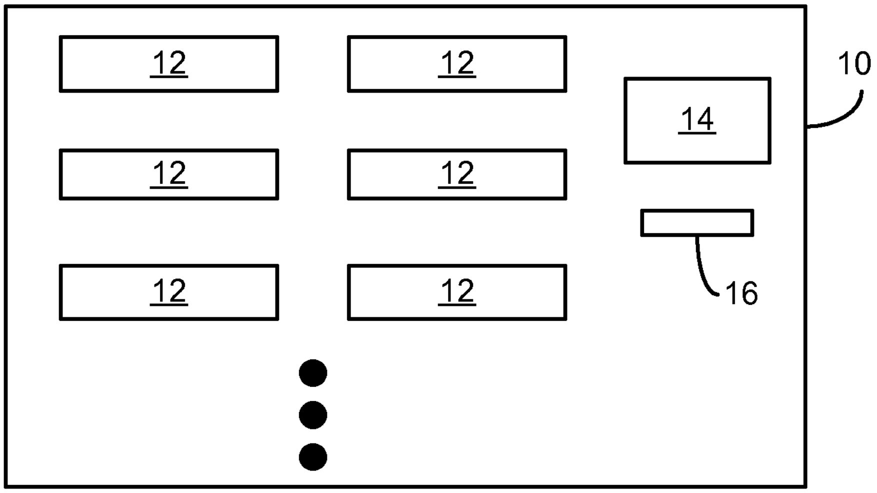
FIG. 1 is a front view of a station for providing hand held tablets to players.

FIG. 1 is a simplified front view of a station 10 in a casino where a player can obtain a wireless tablet 12 for remote playing of a gaming machine. Six tablets 12 are shown for simplicity but normally there would be many more. A display 14 provides instructions to the player and may include a touch screen for entering player information. A slot 16 for reading a card or for accepting cash is used to accept payment for loading credits on a tablet 12. The card may be a prepaid player card, a debit card, a credit card, a player tracking card, or other suitable card. Upon proper payment, the player is instructed to take a particular tablet 12 that has been downloaded credits corresponding to the payment made via slot 16. The credits will typically be loaded wirelessly by a transmitter in station 10.

If, after playing a certain amount of time, the player needs to download more credits, the player can insert additional funds into slot 16, and additional credits will be downloaded onto the player's tablet 12 after the player enters the tablet's address code into the station via a touch screen, keypad, infra red sensor, or other means.

When the player ultimately cashes out, the player communicates the tablet code to the station, the tablet transmits the stored credits to the station, the station resets the credits to zero, and the station issues cash or a ticket via slot 16 (or another slot). The player may redeem the ticket at a cashier's station.

The battery in the tablet 12 is fully charged by the station.

In another embodiment, the station 10 is manned by an operator that receives the player's funds and downloads credits into a tablet 12.

Figure 2:
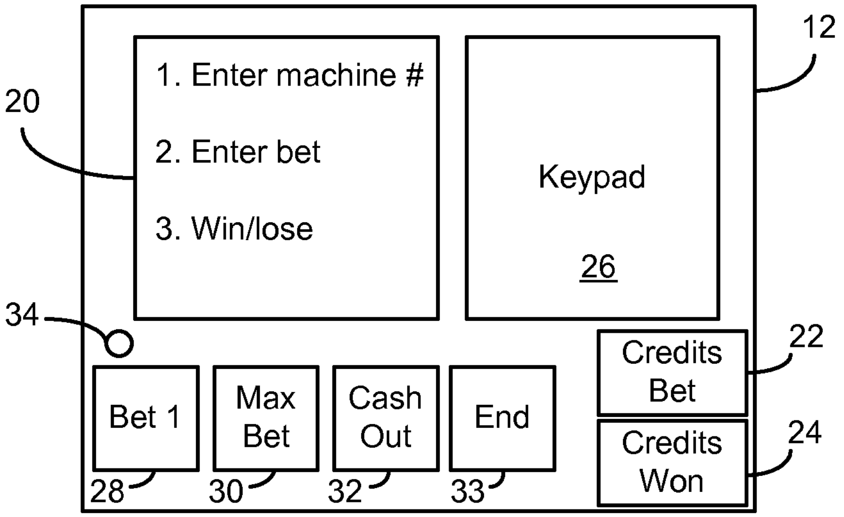
FIG. 2 illustrates the player interfaces on the front of a hand held tablet.

FIG. 2 illustrates the front of a tablet 12. A small display 20, which may be a monochrome or color liquid crystal display, a set of backlit instruction transparencies, or other type of display simply informs the player of the next action to take and any significant events, such as if the player won or lost. The display 20 uses very little battery power, enabling the tablet 12 to be used for many hours without recharging. In one embodiment, the display is not backlit for additional power savings.

Other displays may include a credits bet display 22 and a credits won display 24, which may be part of the main display 20.

A keypad 26 is provided to allow the player to enter and transmit a gaming machine address code. The numerical digits and enter key on the keypad are not shown for simplicity.

A bet button 28 (bets a minimum bet), a maximum bet button 30, a cash out button 32, and an end-connection button 33 are provided. Pressing the cash out button 32 controls the station 10 (FIG. 1) or other device to pay the player the cash equivalent of the stored credits and reset the credits to zero. The end-connection button 33 ends the wireless communication between the tablet 12 and the gaming machine.

A warning light 34 is illuminated when the tablet 12 battery is running low and needs to be recharged or replaced.

The tablet 12 may be the size of a cellular telephone, a personal digital assistant (PDA), or any other small industry standard tablet, since there is no need for a large display to display a game outcome. In one embodiment, the display 20 is less than 7×7 square centimeters.

Figure 3:
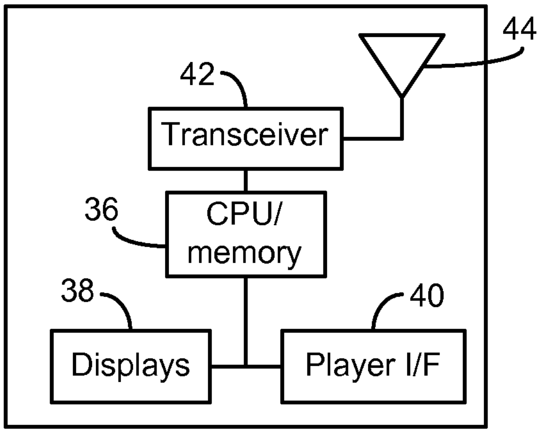
FIG. 3 illustrates a schematic view of the tablet.

FIG. 3 illustrates certain key elements in the tablet 12. A CPU and memory 36 carry out a stored program and processes incoming data. The CPU controls the various displays 38 and receives inputs from the player interface 40. The CPU wirelessly communicates with the gaming machine via a transceiver 42 and antenna 44. BlueTooth WiFi or other short range communication protocols can be used.

The tablet 12 communicates with a conventional gaming machine that has been augmented with a transceiver and processing module for setting up a wireless communication connection with the tablet 12 and communicating the payout signal to the tablet 12. For example, the gaming machine may have a unique address identified on the outside of the gaming machine and stored in its processing module, and the tablet 12 may have a unique address stored in its own memory. The tablet 12 player manually enters the gaming machine address (or other machine identifier) into the keypad 26, which is transmitted to the gaming machine along with certain handshaking codes, including the tablet's unique address.

After a game, the gaming machine transmits a payout signal enabling the tablet 12 to determine whether or not an award is granted to the tablet player. In one embodiment, each additional bet by the tablet player activates another payline. After the game is over, the gaming machine transmits all the paytable wins to the tablet 12 (e.g., a minimum bet wins 30 credits, two bets win 120 credits, etc.), and the tablet 12 determines whether the player's bet covers any of the paytable wins and then increments the credit display/meter accordingly. In another embodiment, with all paylines automatically activated, the tablet 12 just multiples a base payout by the number of credits bet by the player. In another embodiment, the tablet 12 conveys to the gaming machine the bet by the tablet player, the gaming machine then determines the award won by the tablet player using a paytable, and the gaming machine transmits to the tablet 12 the number of credits won. The accumulated credits are stored in the tablet's memory and displayed by the tablet 12.

Although the tablet's display 20 is relatively small, it can optionally display casino information, such as special offers and services, or display entertaining video, such as a movie. The tablet may even use transceiver 42 similar to a cell phone to make a call within the casino for services. The tablet may also include a tracker to locate the tablet remotely in case the player orders a service from the casino, so that the player can be easily found to deliver the service. For example, the tablet may contain a GPS locator or use a casino-based locator and transmit its location to the casino services when being used or when requested by the casino. The tablet may also have the ability to browse the internet.

Although the tablet screen may be too small to adequately reproduce all the graphics on the gaming machine it is communicating with, the graphics may be modified for the tablet to simplify the graphics and focus on only essential elements necessary to see the results of the game. For example, very simple symbols may be used in the tablet graphics.

Although the invention can be implemented by modifying most types of modern gaming machines, such as video and electro-mechanical reel machines, one particular gaming machine platform will be described in detail.

Figure 4:
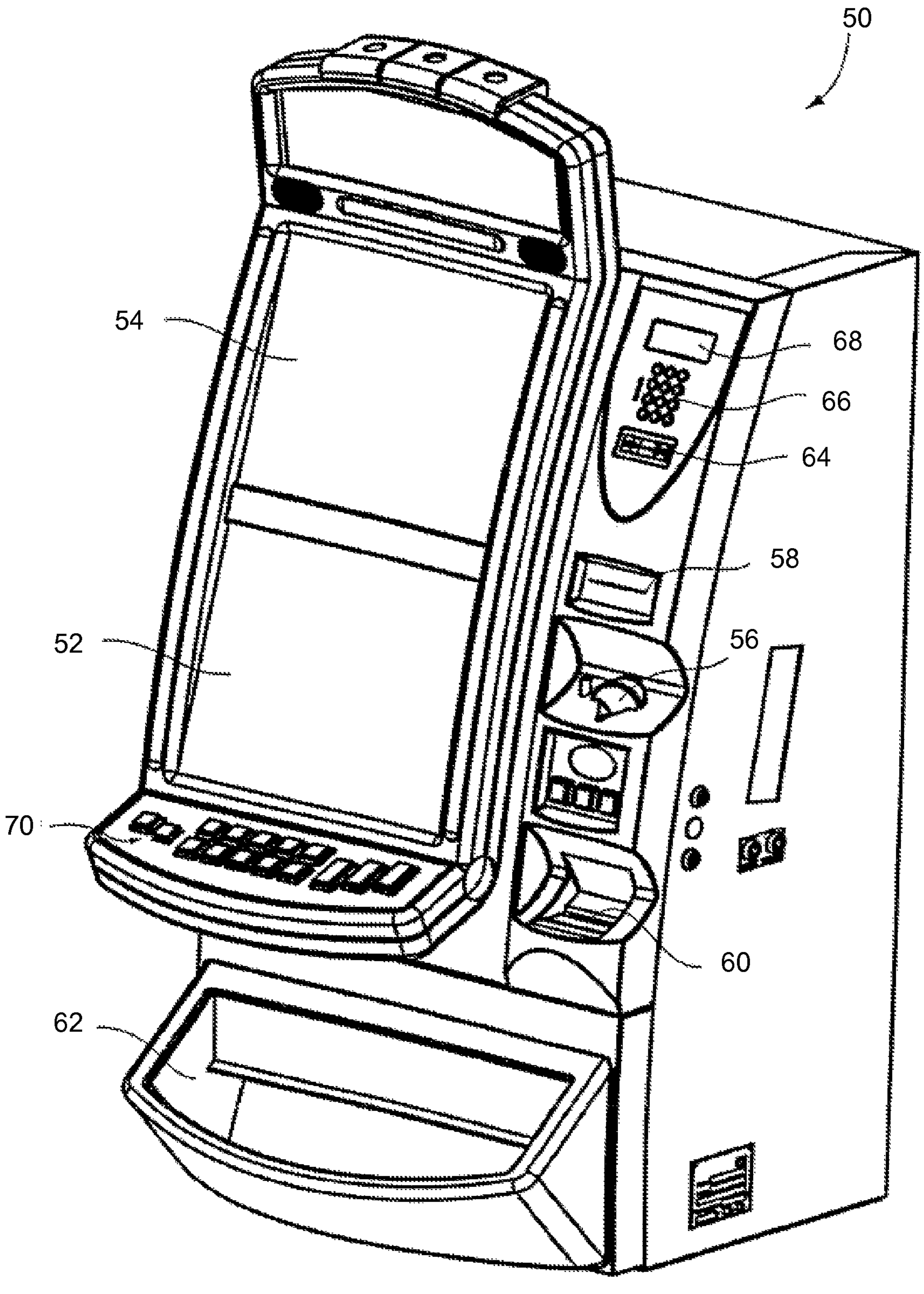
FIG. 4 is a perspective view of one example of a gaming machine incorporating a wireless transceiver for communicating with a hand held tablet.

FIG. 4 is a perspective view of a gaming machine 50 that communicates with the tablet 12, in accordance with one embodiment of the present invention. Machine 50 includes a display 52 that may be a thin film transistor (TFT) display, a liquid crystal display (LCD), a cathode ray tube (CRT), or any other type of display. A second display 54 provides game data or other information in addition to display 52. Display 54 may provide static information, such as an advertisement for the game, the rules of the game, pay tables, paylines, or other information, or may even display the game itself along with display 52. Alternatively, the area for display 54 may be a display glass for conveying information about the game. In one embodiment, display 52 displays a game for a player operating the machine, and display 54 displays a separate game for the tablet 12 player. In the preferred embodiment, however, all players communicating with the gaming machine play the same game to create a unifying social atmosphere.

A coin slot 56 accepts coins or tokens in one or more denominations to generate credits within machine 50 for playing games. An input slot 58 for an optical reader and printer receives machine readable printed tickets and outputs printed tickets for use in cashless gaming. A bill acceptor 60 accepts various denominations of banknotes.

A coin tray 62 receives coins or tokens from a hopper upon a win or upon the player operating the gaming machine cashing out.

A card reader slot 64 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 66 accepts player input, such as a personal identification number (PIN) or any other player information. A display 68 above keypad 66 displays a menu for instructions and other information and provides visual feedback of the keys pressed.

Player control buttons 70 include any buttons needed for the play of the particular game or games offered by machine 50 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable buttons. In other embodiments, buttons 70 are replaced by a touch screen with virtual buttons.

The gaming machine's address for entering into the tablet 12 may be displayed anywhere on the machine, either by an electronic display (e.g., display 68) or by an adhesive label.

The game played may be a spinning reel type game, either using physical reels or simulated reels on a video screen, or the game may be a card game, such as poker. Any other game may be played.

Figure 5:
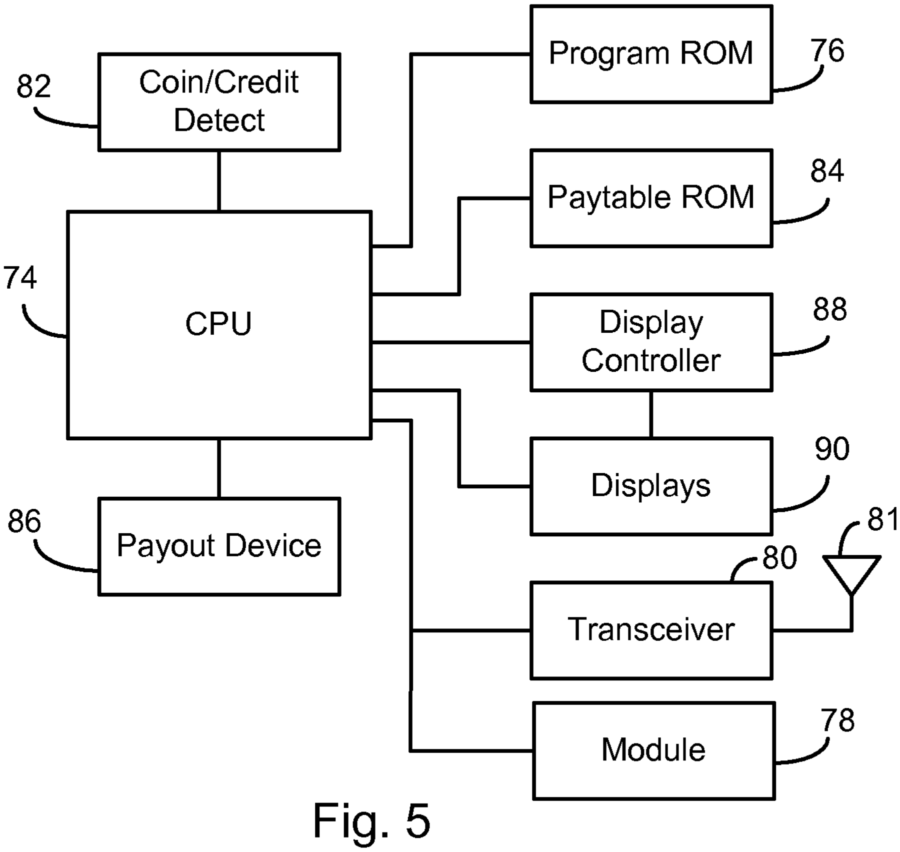
FIG. 5 is a block diagram of various key components in the gaming machine of FIG. 4.

FIG. 5 illustrates basic circuit blocks in a suitable gaming machine. A control unit (CPU 74) runs a gaming program stored in a program ROM 76. The CPU 74 may perform all tasks necessary for communicating with the tablet 12, or the gaming machine may include a separate processor module 78 connected to the main bus that performs the functions needed to communicate with the tablet 12. By using a separate processor module 78, the normal software for the gaming machine does not need to be changed, and the tablet communication tasks are performed independently by the module 78. Signals generated within the gaming machine, such as the payout signals, can easily be processed by the separate processor module 78 for transmission to the tablet 12. Transceiver 80 converts baseband digital signals to RF signals for transmission via antenna 81 to the tablet 12. Conversely, transceiver 80 converts the RF transmissions from the tablet 12 to digital signals. The transmitter need only have a short range since the tablet player will be close enough to the gaming machine to view its game display.

A coin/bill/credit detector 82 enables the CPU 74 to initiate a next game. A pay table ROM 84 detects the outcome of the game and identifies awards to be paid to the player. A payout device 86 pays out an award to the player in the form of coins upon termination of the game or upon the player cashing out. The payout device 86 may instead generate a payout in the form of a coded paper ticket, credits on a smart card or magnetic strip card, or in any other form. The tablet player does not receive a payout from the gaming machine, but must redeem winnings at a separate station.

A display controller 88 receives commands from the CPU 74 and generates signals for the various displays 90.

The player controlling the gaming machine 50 bets and plays the game normally. Once the tablet 12 player logs into the gaming machine 50 using the gaming machine's address, the tablet player may make a bet before any game. The operator player then presses the spin-reels button, or any other start button depending on the particular game, and the gaming machines randomly generates the outcome of the game, such as a combination of symbols in a 3 column×1 row matrix or a 5×3 matrix using simulated or actual spinning reels. At the start of the game, the gaming machine 50 may issue a signal to the tablet 12 indicating that no further bet can be made, and the tablet ignores any pressing of the bet buttons until after the game. The gaming machine then pays off the operating player and sends a signal to the tablet 12 that enables the tablet 12 to determine the award to grant to the tablet players. The tablet player may later cash out by transmitting the stored credits to an automatic payout station for the tablets. Alternately, the gaming machine may have a provision to pay the tablet player with a ticket or cash and reset the tablet's credit meter.

In one embodiment, the tablet 12 and gaming machine 50 have an infrared sensor and transmitter that automatically sets up the communication channel upon the tablet player aiming the tablet at the sensor and pressing a button.

The above embodiment using a standard gaming machine is particularly desirable when the players sharing a gaming machine know each other and want to play together, since one player is initiating play of the next game.

Figure 6:
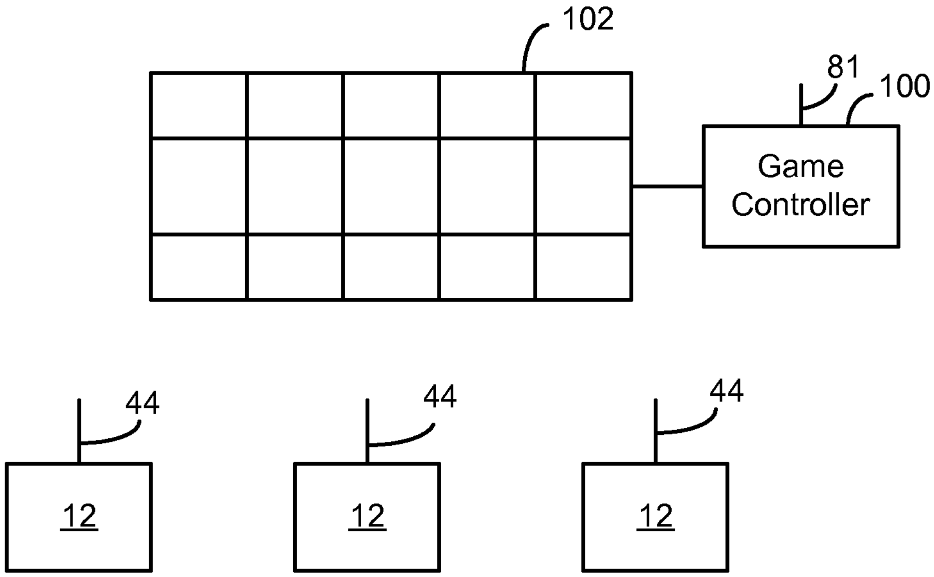
FIG. 6 illustrates a plurality of players with tablets betting independently on the outcome of a single gaming machine, where the gaming machine may be automatically controlled.

FIG. 6 illustrates another use of the tablet 12 in conjunction with a gaming machine. In FIG. 6, there is no operating player at the gaming machine. Rather, the gaming machine is a game controller 100 connected to a large public display 102, such as in a casino lounge. The antennas 44 and 81 for the tablets 12 and game controller 100 are shown. The game controller 100 in conjunction with the display 102 is classified herein as a gaming machine even though it may not contain any player interfaces. The game controller 100 is automatically controlled to start a new game every few seconds. Between games, all the tablet 12 players (three of which are represented in FIG. 6) place bets using their tablets. After each game, the game controller 100 transmits a signal informing the tablets 12 of the outcome so the tablets 12 can compute the credits awarded to the respective players. Since all player are playing the same game, a community spirit will be created in the casino lounge. In one embodiment, the game played is a spinning reels type video game in a 3×1, 3×3, or 5×3 matrix. The game may automatically change over time to prevent tedium. The game may include bonus games with enhanced awards for added excitement.

Figure 7:
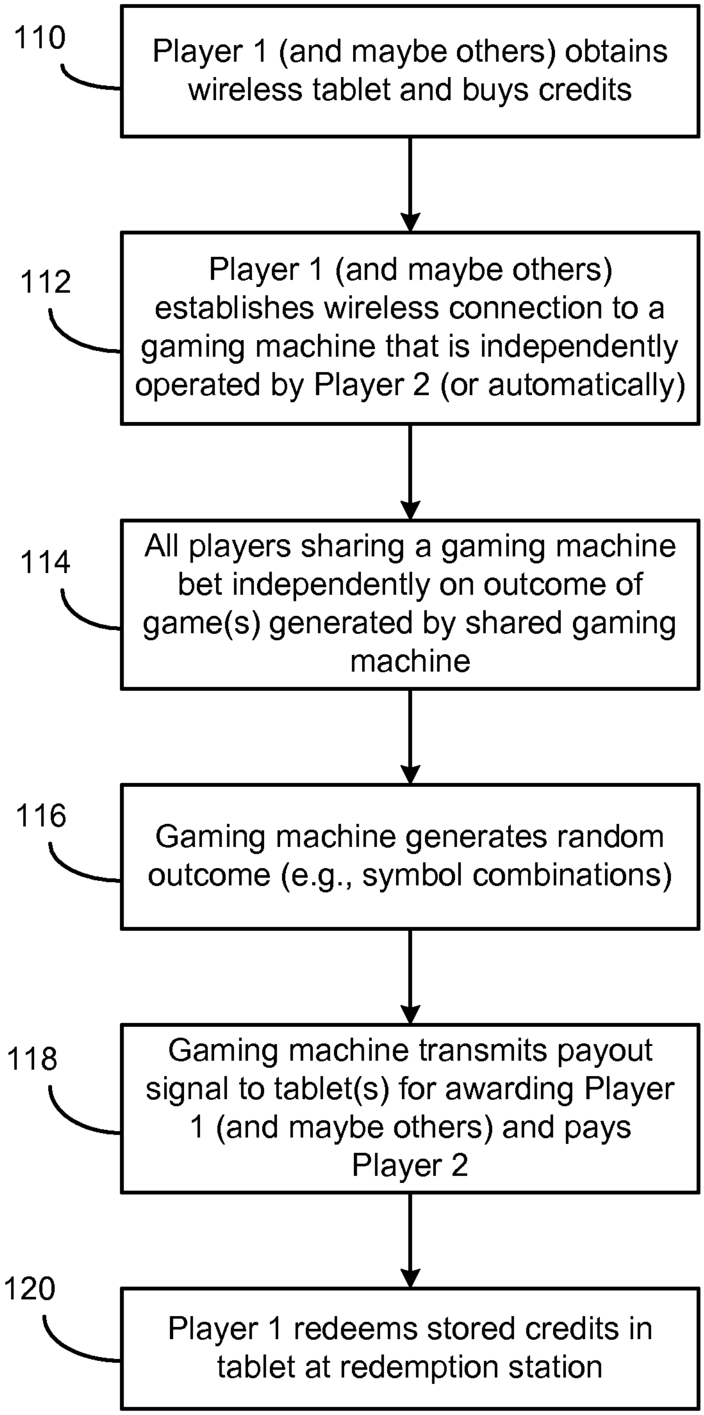
FIG. 7 is a flowchart identifying various steps in a process in accordance with one embodiment of the invention.

FIG. 7 is a flowchart illustrating basic steps used in the invention.

In step 110, one or more players obtain tablets 12 from station 10 (or from an operator) and pay for credits downloaded to the tablets.

In step 112, the tablet player(s) create a communication channel with a particular gaming machine. The gaming machine may be operated by another player or may be controlled automatically (FIG. 6).

In step 114, all players sharing a gaming machine bet independently on the outcome of the next game.

In step 116, the gaming machine generates the random outcome of the game.

In step 118, after a game is completed, the gaming machine transmits information to each of the tablets 12 to enable each tablet 12 to increment a credit meter on the tablet 12, in the event of a win, based on the outcome and the particular bet made by the tablet player.

In step 120, the tablet player, upon cashing out, brings the tablet 12 to a redemption station to wirelessly communicate the stored credits to a payout device to receive a ticket or cash.

While particular embodiments of the present invention have been shown and described, it will be obvious to those skill in the art that changes and modifications may be made without departing from this invention in its broader aspects and, therefore, the appended claims are to encompass within their scope all changes and modifications that fall within the true spirit and scope of the invention.

What is claimed is:

1. A gaming system comprising:

a plurality of hand-held tablets, each tablet containing a wireless transceiver for communicating with a plurality of remote gaming machines, each remote gaming machine having a unique address, each remote gaming machine carrying out a game program and displaying a game, each tablet being configured to enable a player to specify an address of any one of the remote gaming machines, via a player interface, to remotely identify a selected one of the remote gaming machines and establish a wireless connection between the tablet and the selected one of the remote gaming machines, such that physical contact with the selected one of the remote gaming machines is not needed to establish the wireless connection, the remote gaming machines being configured to allow multiple tablets to concurrently establish a wireless connection between the multiple tablets and the same gaming machine, each tablet also being configured for receiving a bet designation by the player, via the player interface, for betting on a game to be played by the selected one of the remote gaming machines, the tablets being configured to allow multiple players to place bets on a same game carried out by the selected one of the remote of gaming machines at the same time, each tablet having a processing circuit for receiving award information from the selected one of the remote gaming machines and determining a number of credits to award associated players, after a game outcome is displayed by the selected one of the remote gaming machines, the tablet not being configured to display the game outcome, wherein the selected one of the remote gaming machines is a stationary gaming machine that carries out a game program and displays a game, the stationary gaming machine comprising a transceiver and processor that communicates with the tablets having a wireless connection to the gaming machine to identify a payout based on a game outcome, wherein the selected one of the remote gaming machines comprises a display screen for viewing by multiple players, each player of an associated one of the tablets being able to independently wager on a same game being displayed on the display screen each tablet being configured to allow any player to select a different one of the remote gaming machines for placing bets wirelessly, wherein any player may change playing from one of the remote gaming machines to another without requiring any physical contact with the selected one of the remote gaming machines.

2. The system of claim 1 wherein the selected one of the remote gaming machines completely carries out and displays the game for a player operating an associated one of the tablets.

3. The system of claim 1 wherein a player operating an associated one of the tablets is a first player, and a second player operates the selected one of the remote gaming machines, the tablets having no means for initiating the game by the selected one of the remote gaming machines.

4. The system of claim 1 wherein the selected one of the remote gaming machines has a housing containing all processing needed to carry out the game and containing a display for displaying the game.

5. The system of claim 1 wherein a circuit in the selected one of the remote gaming machines automatically initiates a game without any player intervention.

6. The system of claim 1 wherein the selected one of the remote gaming machines carries out a game whose outcome is common to a player playing the selected one of the remote gaming machines and the player operating an associated one of the tablets.

7. The system of claim 1 wherein the selected one of the remote gaming machines carries out multiple games, where one game outcome is applied to a player playing the gaming machine and another game outcome is applied to the player operating an associated one of the tablets.

8. The system of claim 1 wherein each tablet's processing circuit conveys information to enable the selected one of the remote gaming machines to communicate with the tablet.

9. The system of claim 1 wherein the game comprises a random selection of symbols in an array solely carried out by the selected one of the remote gaming machines, and an award is based on combinations of symbols in the array.

10. The system of claim 1 further comprising a station that contains a plurality of identical tablets, each tablet being assigned a different communication address for communicating with the plurality of remote gaming machines.

11. The system of claim 10 wherein the station comprises a value receiving device that accepts value from the player and stores an equivalent value of credits in the tablet.

12. A method performed by a gaming system comprising:

providing wireless hand-held tablets to players, each tablet containing a wireless transceiver for communicating with a plurality of remote gaming machines, each remote gaming machine having a unique address, each remote gaming machine carrying out a game program and displaying a game;

providing the plurality of remote gaming machines, each remote gaming machine having a unique address, each remote gaming machine carrying out a game program and displaying a game;

receiving control inputs, by multiple players, by a player interface on associated tablets specifying an address of any one of the remote gaming machines to remotely identify a selected one of the remote gaming machines and establish a concurrent wireless connection between multiple tablets and the selected one of the remote gaming machines, such that physical contact with the selected one of the remote gaming machines is not needed to establish the wireless connection, the remote gaming machines being configured to allow multiple tablets to concurrently establish a wireless connection between the multiple tablets and the same gaming machine;

receiving a bet designation by the players using associated tablets for betting on a game to be played by the selected one of the remote gaming machines;

wirelessly communicating with the tablets, by the selected one of the remote gaming machines, wherein the selected one of the remote gaming machines carries out and displays a game for the players operating the associated tablets, the tablets not being configured to display an outcome of the game; and the selected one of the remote gaming machines transmitting a signal to the tablets to determine an award to grant the players based on an outcome of the game after the outcome of the game is displayed by the selected one of the remote gaming machines, wherein the selected one of the remote gaming machines is a stationary gaming machine that carries out a game program and displays a game, the stationary gaming machine comprising a transceiver and processor that communicates with the tablets having a wireless connection to the gaming machine to identify a payout based on a game outcome, wherein the selected one of the remote gaming machines comprises a display screen for viewing by multiple players, each player of an associated one of the tablets being able to independently wager on a same game being displayed on the display screen, each tablet being configured to allow any player to select a different one of the remote gaming machines for placing bets wirelessly, wherein any player may change playing from one of the remote gaming machines to another without requiring any physical contact with the selected one of the remote gaming machines.

13. The method of claim 12 further comprising an additional player controlling the selected one of the remote gaming machines to initiate games and betting independently of the players betting using the tablets.

14. The method of claim 12 wherein games played on the selected one of the remote gaming machines are initiated automatically without player intervention.

15. The method of claim 12 further comprising the players obtaining the tablets from a station and the station wirelessly downloading credits into the tablets upon payment by the players.

* * * * *